US012772078B2

(12) United States Patent
Lin et al.

(10) Patent No.: US 12,772,078 B2
(45) Date of Patent: Oct. 20, 2026

(54) DETECTING DEGRADATION IN CLIENT CONNECTIVITY AND TRAFFIC IN A WIRELESS ACCESS POINT

(71) Applicant: Juniper Networks, Inc., Sunnyvale, CA (US)

(72) Inventors: May Zar Lin, San Jose, CA (US); Jacob Thomas, Saratoga, CA (US); Wenfeng Wang, Cupertino, CA (US); Marina Shmakova, V, San Jose, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 343 days.

(21) Appl. No.: 18/486,606

(22) Filed: Oct. 13, 2023

(65) Prior Publication Data

US 2025/0126494 A1 Apr. 17, 2025

(51) Int. Cl.
*H04W 24/04* (2009.01)

(52) U.S. Cl.
CPC .................................. *H04W 24/04* (2013.01)

(58) Field of Classification Search
CPC .. H04W 24/04; H04W 24/02; H04L 41/0654; H04L 41/142; H04L 41/5009; H04L 43/16; H04L 43/0811; H04L 41/147
See application file for complete search history.

(56) References Cited

U.S. PATENT DOCUMENTS

| | | | | |
|---|---|---|---|---|
| 9,936,028 B2 * | 4/2018 | Ganu | H04L 67/142 |
| 2018/0063758 A1 * | 3/2018 | Velu | H04L 5/0035 |
| 2018/0220314 A1 * | 8/2018 | Chen | H04W 24/04 |
| 2020/0236008 A1 | 7/2020 | Safavi | |
| 2021/0160125 A1 * | 5/2021 | Cheng | G06N 20/00 |
| 2021/0282024 A1 * | 9/2021 | Moreman | H04W 64/00 |
| 2023/0053044 A1 * | 2/2023 | Wang | H04W 24/04 |
| 2023/0276207 A1 * | 8/2023 | Sood | H04W 4/20 455/67.11 |
| 2024/0223489 A1 * | 7/2024 | Wu | H04L 43/106 |
| 2024/0430153 A1 * | 12/2024 | Safavi | H04L 41/0681 |
| 2025/0048183 A1 * | 2/2025 | Sampathkumar | H04W 28/082 |

FOREIGN PATENT DOCUMENTS

EP 4135287 A1 2/2023

OTHER PUBLICATIONS

Extended Search Report from counterpart European Application No. 24151691.3 dated Apr. 24, 2024, 8 pp.
Response to Extended Search Report dated Apr. 24, 2024, from counterpart European Application No. 24151691.3 filed Oct. 6, 2025, 24 pp.

* cited by examiner

*Primary Examiner* — Abdullahi E Salad
(74) *Attorney, Agent, or Firm* — Shumaker & Sieffert P.A.

(57) ABSTRACT

Example network management systems, techniques, and computer-readable media are set forth herein. An example network management system is configured to obtain client activity data of one or more access point (AP) devices. The example network management system is configured to determine, based on the client activity data, an anomaly in a behavior of an AP device of the one or more AP devices based on at least one of a comparison to forecasted client activity data of the AP device or a comparison to client activity data of at least one peer AP device. The network management system is configured to perform, based on the determined anomaly in the behavior of the AP device, an action.

19 Claims, 4 Drawing Sheets

DETECTING DEGRADATION IN CLIENT CONNECTIVITY AND TRAFFIC IN A WIRELESS ACCESS POINT

TECHNICAL FIELD

The disclosure relates generally to computer networks and, more specifically, to monitoring and troubleshooting wireless access points of computer networks.

BACKGROUND

Commercial premises or sites, such as offices, hospitals, airports, stadiums, or retail outlets, often install complex wireless network systems, including a network of wireless access points (APs), throughout the premises to provide wireless network services to one or more wireless client devices (or simply, "clients"). APs are physical, electronic devices that enable other devices to wirelessly connect to a wired network using various wireless networking protocols and technologies, such as wireless local area networking protocols conforming to one or more of the IEEE 802.11 standards (i.e., "Wi-Fi"), Bluetooth/Bluetooth Low Energy (BLE), mesh networking protocols such as ZigBee, 5G, or other wireless networking technologies. Many different types of wireless client devices, such as laptop computers, smartphones, tablets, wearable devices, appliances, and Internet of Things (IoT) devices, incorporate wireless communication technology and can be configured to connect to wireless access points when the device is in range of a compatible wireless access point in order to access a wired network. In the case of a client device running a cloud-based application, such as voice over Internet Protocol (VOIP) applications, streaming video applications, gaming applications, or video conference applications, data is exchanged during an application session from the client device through one or more APs and one or more wired network devices, e.g., switches, routers, and/or gateway devices, to reach the cloud-based application server.

SUMMARY

Wireless networks may include one or more network devices (e.g., access point (AP) devices) that provide wireless network services to one or more client devices. As more AP models and firmware versions are deployed in a network, new and/or unknown issues with the network experience may occur, such as unexpected dropping of connectivity to client devices, client devices failing to connect, a low volume of traffic or throughput, or the like. The techniques of this disclosure relate to the proactive detection of the health (or lack thereof) of an AP device based on client activity data.

The techniques of this disclosure provide for the proactive detection of anomalies in behavior of an AP device based on client activity data. In some examples, an anomaly in behavior of an AP device may be an anomaly in behavior of a radio of the AP device. A computing device, such as a Network Management System (NMS) that provides management of AP devices of one or more sites, may include an inclusive detection engine, clustering engine, and exclusive detection engine to proactively detect anomalies in the behavior of an AP device based on client activity data and/or perform remedial actions to attempt to address any such anomalies. As used herein, a site may include a facility at a specific geographic location as opposed to a geographically distributed facility or a plurality of facilities at different geographic locations.

In general, this disclosure describes one or more techniques for a network management system (NMS) to proactively identify anomalies in behavior of APs and/or take one or more actions to attempt to rectify the anomalous behavior of such APs. For example, the NMS may use one or more machine learning models to predict client activity data for an AP and compare the actual client activity data of an AP to the predicted client activity data of the AP. Additionally, or alternatively, the NMS may compare the actual client activity data of the AP to actual client activity data of peer APs.

Client activity data may include, for example, a number of client devices connected to the AP device or a radio of the AP device, a length of time each client device is connected to the AP device or a radio of the AP device, an amount of client traffic transmitted by the AP device or a radio of the AP device over a period of time, and/or an amount of client traffic received by the AP device or a radio of the AP device over time. In some examples, NMS may generate one or more scores based on client activity data and predicted client activity data and/or the comparison of the client activity data of the AP device to client activity data of peer AP devices. The NMS may determine an anomaly in the behavior of the AP device and take an action to attempt to address the anomaly. If the action is not successful, the NMS may take further action(s) to attempt to address the anomaly.

An example includes a network management system comprising: one or more memories: and one or more processors in communication with the one or more memories and configured to: obtain client activity data of one or more access point (AP) devices: determine, based on the client activity data, an anomaly in a behavior of an AP device of the one or more AP devices, wherein as part of determining the anomaly in the behavior of the AP device, the one or more processors are configured to at least one of a) determine, based on the client activity data, a forecasted client activity data of the AP device and compare the forecasted client activity data to actual client activity data of the AP device, or b) compare client activity data of at least one peer AP device to the actual client activity data of the AP device: and perform, based on the determined anomaly in the behavior of the AP device, an action.

Another example includes a method of managing one or more access points, the method comprising: obtaining client activity data of a plurality of access point (AP) devices at a site: determining, based on the client activity data, an anomaly in a behavior of an AP device of the plurality of AP devices, wherein as part of determining the anomaly in the behavior of the AP device, the one or more processors are configured to at least one of a) determine, based on the client activity data, a forecasted behavior of the AP device and compare the forecasted client activity data to actual client activity data of the AP device, or b) compare client activity data of at least one peer AP device to the actual client activity data of the AP device: and performing, based on the determined anomaly in the behavior of the AP device, an action.

Another example includes computer-readable storage media comprising instructions that, when executed by processing circuitry, cause the processing circuitry to: obtain client activity data of a plurality of access point (AP) devices at a site: determine, based on the client activity data, an anomaly in a behavior of an AP device of the one or more AP devices, wherein as part of determining the anomaly in the behavior of the AP device, the one or more processors are configured to at least one of a) determine, based on the client activity data, a forecasted client activity data of the AP device and compare the forecasted client activity data to actual client activity data of the AP device, or b) compare client activity data of at least one peer AP device to the actual client activity data of the AP device: and perform, based on the determined anomaly in the behavior of the AP device, an action.

The disclosed techniques may provide one or more technical advantages and practical applications. For example, by monitoring client activity data of an AP and comparing that activity data to at least one of predicted client activity data or client activity data of peer APs, the NMS may proactively identify AP anomalies and take action to address such anomalies. Such techniques may result in more timely addressing of problems with APs in a network than reactively identifying and addressing such problems.

The details of one or more examples of the techniques of this disclosure are set forth in the accompanying drawings and the description below. Other features, objects, and advantages of the techniques will be apparent from the description and drawings, and from the claims.

DETAILED DESCRIPTION

Figure 1:
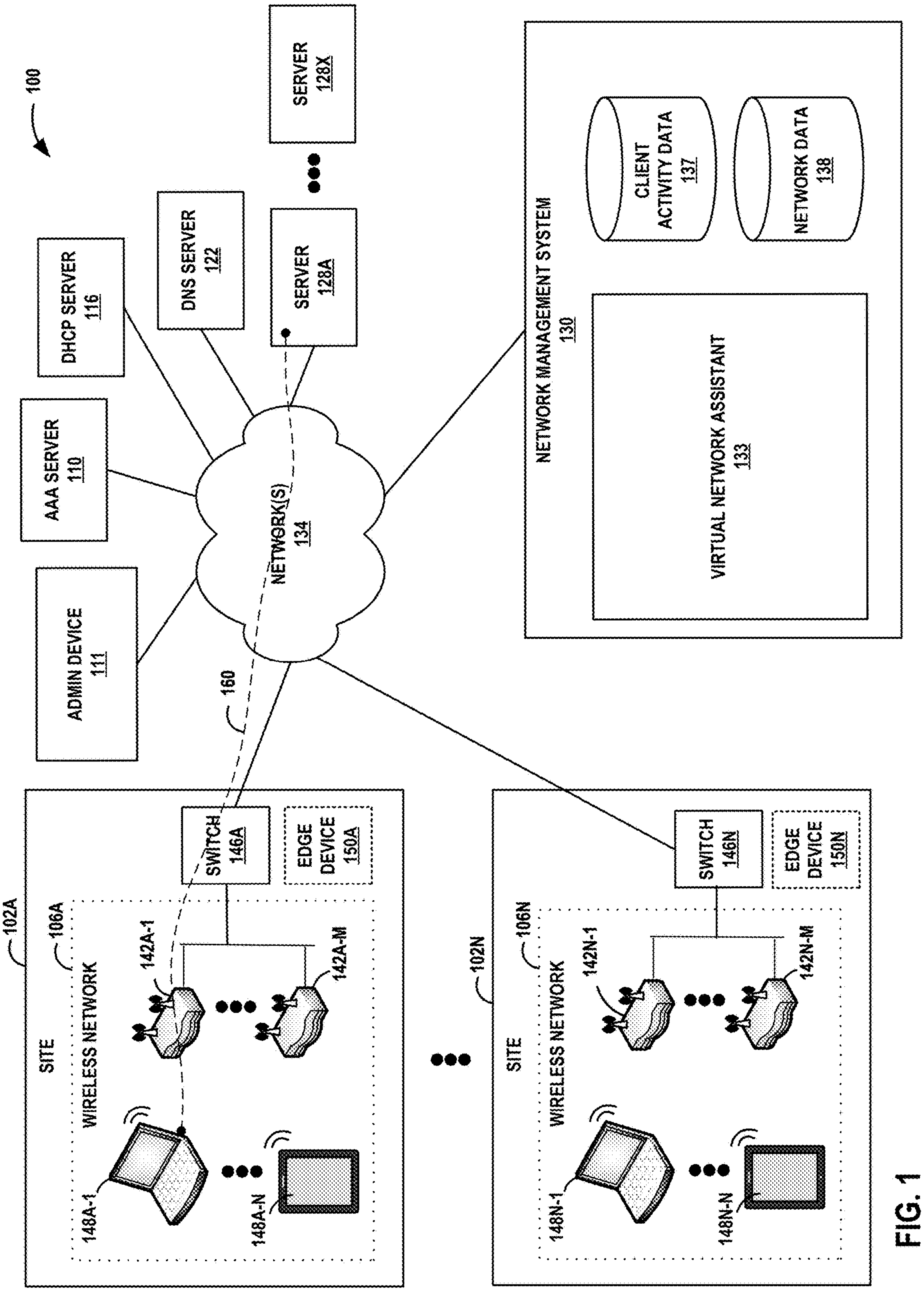
FIG. 1 is a block diagram of an example network system in which a network management system identifies one or more contributing features of an issue of an application session and invokes one or more actions to remedy or prevent the issue, in accordance with one or more techniques of the disclosure.

FIG. 1 is a block diagram of an example network system 100 in which a network management system (NMS) 130 determines an anomaly with an access point (AP) and invokes one or more actions to remedy the anomaly, in accordance with one or more aspects of this disclosure. Example network system 100 includes a plurality sites 102A-102N at which a network service provider manages one or more wireless networks 106A-106N, respectively. Although in FIG. 1 each site 102A-102N is shown as including a single wireless network 106A-106N, respectively, in some examples, each site 102A-102N may include multiple wireless networks, and the disclosure is not limited in this respect.

Each site 102A-102N includes a plurality of network access server (NAS) devices, such as access points (APs) 142, switches 146, or routers (not shown) within the wired network edge. For example, site 102A includes a plurality of APs 142A-1 through 142A-M. Similarly, site 102N includes a plurality of APs 142N-1 through 142N-M. Each AP 142 may be any type of wireless access point, including, but not limited to, a commercial or enterprise AP, a router, or any other device that is connected to the wired network and is capable of providing wireless network access to client devices within the site. For example, when APs 142 represent Wi-Fi devices, one or more of APs 142 may include a plurality of radios, such as a 2.4 GHz radio, a 5 GHz radio, a 6 GHz radio and/or the like for connecting with the client devices.

Each site 102A-102N also includes a plurality of client devices, otherwise known as user equipment devices (UEs), referred to generally as UEs or client devices 148, representing various wireless-enabled devices within each site. For example, a plurality of UEs 148A-1 through 148A-M are currently located at site 102A. Similarly, a plurality of UEs 148N-1 through 148N-M are currently located at site 102N. Each UE 148 may be any type of wireless client device, including, but not limited to, a mobile device such as a smart phone, tablet or laptop computer, a personal digital assistant (PDA), a wireless terminal, a smart watch, smart ring, or other wearable device. UEs 148 may also include wired client-side devices, e.g., IoT devices such as printers, security devices, environmental sensors, or any other device connected to the wired network and configured to communicate over one or more wireless networks 106. While each site 102A-102N is shown having one wireless network of wireless networks 106, in some examples, one or more sites of sites 102 may include more than one wireless network. For example, APs 142A1 through 142A-M of site 102A may provide a plurality of wireless networks, such as a guest network, an employee network, and an employee-secure network. In some examples, the techniques of this disclosure may be applied to the wireless networks on a wireless network basis, rather than, or in addition to, being applied to APs and/or radios of APs. For example, the techniques of this disclosure may be applied to identify an anomaly in the employee-secure network based on client activity data of one or more AP devices associated with the employee-secure network and/or associated with peer networks, such as the guest network and/or the employee network.

In order to provide wireless network services to UEs 148 and/or communicate over the wireless networks 106, APs 142 and the other wired client-side devices at sites 102 are connected, either directly or indirectly, to one or more network devices (e.g., switches, routers, or the like) via physical cables, e.g., Ethernet cables. In the example of FIG. 1, site 102A includes a switch 146A to which each of APs 142A-1 through 142A-M at site 102A are connected. Similarly, site 102N includes a switch 146N to which each of APs 142N-1 through 142N-M at site 102N are connected. Although illustrated in FIG. 1 as if each site 102 includes a single switch 146 and all APs 142 of the given site 102 are connected to the single switch 146, in other examples, each site 102 may include more or fewer switches and/or routers. In addition, the APs and the other wired client-side devices of the given site may be connected to two or more switches and/or routers. In addition, two or more switches at a site may be connected to each other and/or connected to two or more routers, e.g., via a mesh or partial mesh topology in a hub-and-spoke architecture. In some examples, interconnected switches and routers comprise wired local area networks (LANs) at sites 102 hosting wireless networks 106.

Example network system 100 also includes various networking components for providing networking services within the wired network including, as examples, an Authentication, Authorization and Accounting (AAA) server 110 for authenticating users and/or UEs 148, a Dynamic Host Configuration Protocol (DHCP) server 116 for dynamically assigning network addresses (e.g., IP addresses) to UEs 148 upon authentication, a Domain Name System (DNS) server 122 for resolving domain names into network addresses, a plurality of servers 128A-128X (collectively "servers 128") (e.g., web servers, databases servers, file servers, application servers, and the like), and a network management system (NMS) 130. As shown in FIG. 1, the various devices and systems of network 100 are coupled together via one or more network(s) 134, e.g., the Internet and/or an enterprise intranet.

In the example of FIG. 1, NMS 130 is a cloud-based computing platform that manages wireless networks 106A-106N at one or more of sites 102A-102N. NMS 130 provides an integrated suite of management tools and implements various techniques of this disclosure. In general, NMS 130 may provide a cloud-based platform for wireless network data acquisition, monitoring, activity logging, reporting, predictive analytics, network anomaly identification, and alert generation. In some examples, NMS 130 outputs notifications, such as alerts, alarms, graphical indicators on dashboards, log messages, text/SMS messages, email messages, and the like, and/or recommendations regarding wireless network issues to a site or network administrator ("admin") interacting with and/or operating admin device 111. Additionally, in some examples, NMS 130 operates in response to configuration input received from the administrator interacting with and/or operating admin device 111. In some examples, NMS 130 proactively identifies anomalies associated with any of APs 142 (and/or radios thereof) and takes corrective action to address the anomalies.

The admin device 111 may comprise IT personnel and/or administrator computing device associated with one or more of sites 102 and/or switches 146 at the wired network edge. Admin device 111 may be implemented as any suitable device for presenting output and/or accepting user input. For instance, admin device 111 may include a display. Admin device 111 may be a computing system, such as a mobile or non-mobile computing device operated by a user and/or by the administrator. Admin device 111 may, for example, represent a workstation, a laptop or notebook computer, a desktop computer, a tablet computer, or any other computing device that may be operated by a user and/or present a user interface in accordance with one or more aspects of the present disclosure. Admin device 111 may be physically separate from and/or in a different location than NMS 130 such that admin device 111 may communicate with NMS 130 via network 134 or other means of communication.

In some examples, one or more of the NAS devices, e.g., APs 142, switches 146, or routers, may connect to edge devices 150A-150N via physical cables, e.g., Ethernet cables. Edge devices 150 comprise cloud-managed, wireless local area network (LAN) controllers. Each of edge devices 150 may comprise an on-premises device at a site 102 that is in communication with NMS 130 to extend certain microservices from NMS 130 to the on-premises NAS devices while using NMS 130 and its distributed software architecture for scalable and resilient operations, management, troubleshooting, and analytics.

Each one of the network devices of network system 100, e.g., servers 110, 116, 122 and/or 128, APs 142, UEs 148, switches 146, and any other servers or devices attached to or forming part of network system 100, may include a system log or an error log engine wherein each one of these network devices records the status of the network device including normal operational status and error conditions.

In some examples, NMS 130 monitors network data 138 and client activity data 137 received from wireless networks 106A-106N at each site 102A-102N, respectively, and manages network resources, such as APs 142 at each site, to deliver a high-quality wireless experience to end users, IoT devices and clients at the site. For example, NMS 130 may receive client activity data 137 and network data 138 from sites 102, associated with APs 142. NMS 130 may include a virtual network assistant (VNA) 133 that implements an event processing platform for providing real-time insights and simplified troubleshooting for IT operations, and that automatically takes corrective action or provides recommendations to proactively address wired or wireless network issues. VNA 133 may, for example, process hundreds or thousands of concurrent streams of network data 138 and client activity data 137 from sensors and/or agents associated with APs 142 and/or nodes within network 134. For example, VNA 133 of NMS 130 may include an underlying inclusive detection engine, clustering engine, and exclusive detection engine in accordance with various examples described herein. These engines may apply historical data and models to identify anomalies, classify the identified anomalies, and take remedial actions to attempt to remedy the anomalies. VNA 133 may provide real-time alerting and reporting to notify a site or network administrator via admin device 111 of any anomalies, trends, and may perform root cause analysis and automated or assisted error remediation. In some examples, VNA 133 of NMS 130 may apply machine learning techniques to identify the root cause of an anomaly from the streams of network data 138 and/or client activity data 137. VNA 133 may take a remedial action to address anomaly, thus automatically improving the underlying SLE metrics and also automatically improving the user experience.

In operation, NMS 130 observes, collects and/or receives client activity data 137 and network data 138, which may take the form of data extracted from messages, counters, and statistics, for example. Network data 138 may include a plurality of states or parameters indicative of one or more aspects of wireless network performance, such as service level expectation/experience (SLE) metrics (e.g., RSSI, jitter, transmission bytes, radio utilization, total number of clients per AP, number of APs per site), events, etc. In accordance with one specific implementation, a computing device is part of NMS 130. In accordance with other implementations, NMS 130 may comprise one or more computing devices, dedicated servers, processes, virtual machines, containers, services, and/or other forms of environments for performing the techniques described herein. Similarly, computational resources and components implementing VNA 133 may be part of the NMS 130, may execute on other servers or execution environments, or may be distributed to nodes within network 134 (e.g., routers, switches, controllers, gateways, and the like).

Client activity data 137 may include a number of client devices connected to an AP device of APs 142 or a radio of the AP device of APs 142, a length of time each client device is connected to the AP device of APs 142 or a radio of the AP device of APs 142, an amount of client traffic transmitted by the AP device of APs 142 or a radio of the AP device of the APs 142 over a period of time, an amount of client traffic received by the AP device of APs 142 or a radio of the AP device of APs 142 over the period of time, or other device indicative of the activity of client devices connected to the AP device or a radio of the AP device.

One or more of servers 128 may include application servers that provide cloud-based applications. The cloud-based applications may include, for example, video conferencing applications, gaming applications, or other applications. UEs 148 may establish application sessions with application servers via network devices of network system 100 (e.g., APs 142, switches 146, etc.). For example, in a client-to-cloud application session topology of application session 160, a client device 148A-1 may interface with a wireless network 106A. which in turn may be in communication with a wired network. The wired network may be in communication with a WAN that may interface with a service provider network provided by an Internet service provider (ISP), such as network 134, which in turn provides connectivity to a third-party application server, e.g., server 128A, which provides an instance of an application to the client device.

NMS 130 may be configured to detect anomalies (e.g., potential issues) in the behavior of an AP device of APs 142 based on information indicative of client activity of each AP device, such as a number of client devices connected to an AP device or a radio of the AP device, a dwell time of each client device connected to the AP device (e.g., how long a client device is connected to the AP device) or a radio of the AP device, an amount of client traffic transmitted and/or received by the AP device or a radio of the AP device over a period of time, or the like (e.g., client activity data 137). For example, NMS 130 may apply one or more machine learning models to client activity data of one or more APs to forecast future client activity of the AP device. In some examples, NMS 130 may exclude client activity data from certain AP device(s) to be applied to the machine learning model(s), such as client activity data from inactive AP devices, inactive radios, inactive sites, new AP devices, dormant AP devices, dormant radios, dormant sites, and/or low activity AP devices or radios, as such client activity data may undeservedly skew the forecast. In some examples, NMS 130 may perform such exclusion based on a user selection to exclude the client activity data from certain AP device(s) and/or radios. In some examples, NMS 130 may pre-select client activity data from certain site(s) (e.g., site 102A) or organization(s) (e.g., which may include more than one site) to apply to the forecast model. In some examples, NMS 130 may apply a probabilistic classification algorithm to the client activity data to forecast a prediction interval (e.g., a range with a certain probability) or a baseline indicative of an estimation of a future observation of client activity (e.g., forecasted number of client devices to be connected to the AP device). For example, NMS 130 may use quantile simulations to forecast an estimated range or baseline of a number of client devices to be connected to an AP device and/or an estimated range or baseline of an amount of client traffic to be transmitted or received by the AP device, or the like. In some examples, NMS 130 may use conformal prediction to forecast an estimated range or baseline of a number of client devices to be connected to an access point and/or an estimated range or baseline of an amount of client traffic to be transmitted or received by the AP device. NMS 130 may detect an anomaly in the behavior of an AP device by determining whether incoming client activity data is within the forecasted prediction interval and/or equal to or over the baseline. For example, a determination that the incoming client activity data falls below the lower prediction interval of the forecasted prediction interval, and/or below the baseline, may be indicative of an anomaly in the behavior of the AP device.

In some examples, NMS 130 may be configured to detect anomalies in the behavior of an AP device based on a comparison of client activity data between peer AP devices. In some examples, peer AP devices may include AP devices at a same site (e.g., AP 142A-1 and AP 142A-M may be peer AP devices because they are both at site 102A). In some examples, peer AP devices may include AP devices of a same model, make, software edition, and/or the like. In some examples, peer AP devices may represent neighboring AP devices, such as AP devices that detect a signal of at least a predefined signal strength (e.g., RSSI) from each other.

For example, NMS 130 may obtain client activity data corresponding to peer AP devices (e.g., APs 142A-1-142A-M), such as a number of client devices connected to each of the peer AP devices and/or an amount of traffic corresponding to each of the peer AP devices. NMS 130 may compare the client activity data corresponding to the peer AP devices, and based on the comparison, may detect an anomaly in the behavior of an AP device of the peer group of AP devices. For example, AP 142A-1 and AP 142A-M may be peer devices. In this example, NMS 130 may obtain a number of client devices of UEs 148 connected to AP 142A-1 and a number of client devices of UEs 148 connected to AP 142A-M. Based on a comparison of the number of client devices connected to AP 142A-1 and a number of client devices connected to AP 142A-M, NMS 130 may determine that there is a discrepancy between the number of client devices connected to AP 142A-1 (e.g., 0 connected client devices over a period of time) and the number of client devices connected to AP 142A-M the second AP device (e.g., 100 connected client devices over the same period of time). This discrepancy may indicate a potential issue with AP 142A-1. As another example, NMS 130 may obtain client activity data, such as an amount of client traffic handled by AP 142A-1 and an amount of client traffic handled by AP 142A-M during a given time period. Based on the comparison of the amount of client traffic handled by AP 142A-1 (e.g., low traffic throughput) and the amount of client traffic handled by AP 142A-M (e.g., high traffic throughput) during the given time period, NMS 130 may determine that there is a discrepancy between the amount of client traffic between the peer AP devices that may indicate a potential issue with AP 142A-1. In some examples, a plurality of client activity data is used to detect an anomaly. For example, NMS 130 may obtain client activity data, such as a number of connected client device and an amount of client traffic handled by AP 142A-1 during a given time period. NMS 130 may determine that there is an anomaly if there is a high number of client devices connected to AP 142A-1, but a low amount of client traffic handled by AP 142A-1. In other examples, NMS 130 may obtain client activity data, such as the number of repeated connections by client devices and determine that there is an anomaly if there is a certain number of repeated connections. In some examples, NMS 130 may obtain client activity data corresponding to all AP devices at a site to identify whether the potential issue is attributable to a site-level problem (e.g., a problem with switch 146A or edge device 150A) rather than to individual AP devices 142.

NMS 130 may also be configured to determine a scope of the issue (e.g., whether issue is experienced from the organization level, site level, AP device level, or the like) and to classify the AP devices having detected anomalies (e.g., determined from the inclusive detection engine) as AP devices with a known issue, AP devices with an unknown issue, and/or AP devices that were incorrectly identified as having an issue (e.g., false positive).

For AP devices with known issues, NMS 130 may be configured to perform a remedial action associated with such known issues. The remedial actions may include re-initializing a radio of the AP device, resetting the radio of the AP device, switching the channel, restarting a device or process associated with monitoring SLE metrics, resetting the AP device, initiate a return material authorization (RMA) procedure, power off a radio, etc. For example, NMS 130 may control an AP device having a known issue to perform a remedial action. If the remedial fails to correct the anomaly, in some examples, NMS 130 may take one or more further remedial actions to attempt to resolve the issue. In some examples, the remedial actions may be taken in an order, for example, from least interrupting to most interrupting until the issue is resolved.

For AP devices with unknown issues, NMS 130 may send information associated with the AP device with unknown issues (e.g., the client traffic data and/or other information) for further analysis. For example, NMS 130 may send the information to admin device 111 for an administrator or tech support to analyze. The administrator or tech support may undertake network testing, for example, in an attempt to identify the issue. If the administrator or tech support does identify the issue, the administrator or tech support may log the issue as known such that NMS 130 may attempt to remedy the now known issue and/or for subsequent occurrences of the issue. In some examples, NMS 130 may classify one or more AP devices that were incorrectly identified as having an issue and provide feedback, such as training, to a machine learning algorithm that identified the anomaly associated with the AP device.

Although the techniques of the present disclosure are described in this example as performed by NMS 130, techniques described herein may be performed by any other computing device(s), system(s), and/or server(s), and that the disclosure is not limited in this respect. For example, one or more computing device(s) configured to execute the functionality of the techniques of this disclosure may reside in a dedicated server or be included in any other server in addition to or other than NMS 130, or may be distributed throughout network 100 (e.g., in edge devices 150), and may or may not form a part of NMS 130.

Figure 2:
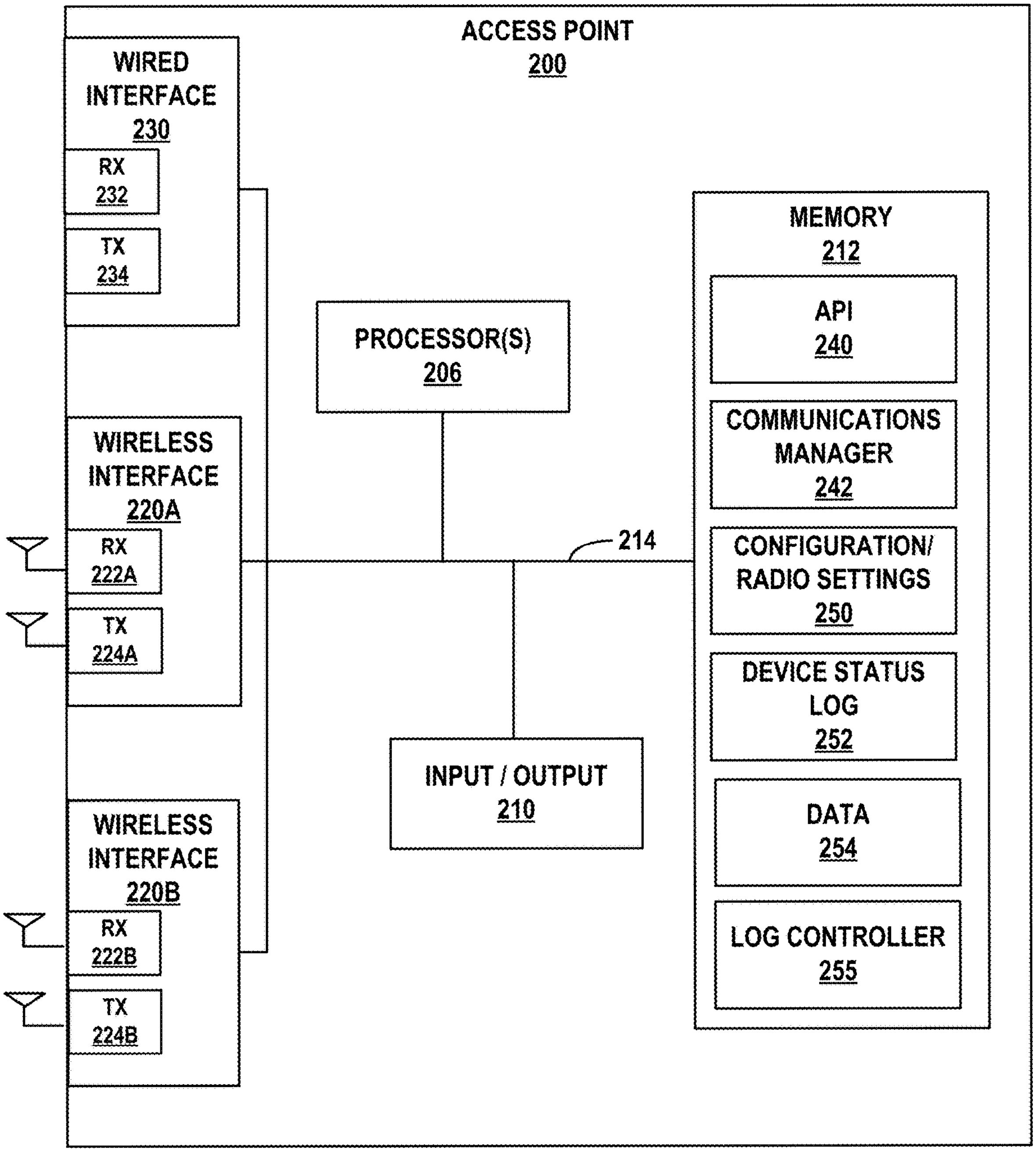
FIG. 2 is a block diagram of an example access point device, in accordance with one or more techniques of this disclosure.

FIG. 2 is a block diagram of an example access point (AP) device 200 configured in accordance with one or more techniques of this disclosure. Example access point 200 shown in FIG. 2 may be used to implement any of APs 142 as shown and described herein with respect to FIG. 1. Access point 200 may comprise, for example, a Wi-Fi, 5G, Bluetooth and/or Bluetooth Low Energy (BLE) base station or any other type of wireless access point.

In the example of FIG. 2, access point 200 includes a wired interface 230, wireless interfaces 220A-220B one or more processor(s) 206, memory 212, and input/output 210, coupled together via a bus 214 over which the various elements may exchange data and information. Wired interface 230 represents a physical network interface and includes a receiver 232 and a transmitter 234 for sending and receiving network communications, e.g., packets. Wired interface 230 couples, either directly or indirectly, access point 200 to a wired network device, such as one of switches 146 of FIG. 1, within the wired network via a cable, such as an Ethernet cable.

First and second wireless interfaces 220A and 220B represent wireless network interfaces and include receivers 222A and 222B, respectively, each including a receive antenna via which access point 200 may receive wireless signals from wireless communications devices, such as UEs 148 of FIG. 1. First and second wireless interfaces 220A and 220B further include transmitters 224A and 224B, respectively, each including transmit antennas via which access point 200 may transmit wireless signals to wireless communications devices, such as UEs 148 of FIG. 1. As such, first and second wireless interfaces 220A and 220B may represent different radios of access point 200. In some examples, first wireless interface 220A may include a Wi-Fi 802.11 interface (e.g., 2.4 GHz, 5 GHz, and/or 6 GHz) and second wireless interface 220B may include a Bluetooth interface and/or a Bluetooth Low Energy (BLE) interface. In some examples, both first wireless interface 220A and second wireless interface 220B represent different Wi-Fi 802.11 interfaces. In some examples, access point 200 may include more than two wireless interfaces.

Processor(s) 206 are programmable hardware-based processors configured to execute software instructions, such as those used to define a software or computer program, stored to a computer-readable storage medium (such as memory 212), such as non-transitory computer-readable mediums including a storage device (e.g., a disk drive, or an optical drive) or a memory (such as Flash memory or RAM) or any other type of volatile or non-volatile memory, that stores instructions to cause the one or more processors 206 to perform the techniques described herein.

Memory 212 includes one or more devices configured to store programming engines and/or data associated with operation of access point 200. For example, memory 212 may include a computer-readable storage medium, such as non-transitory computer-readable mediums including a storage device (e.g., a disk drive, or an optical drive) or a memory (such as Flash memory or RAM) or any other type of volatile or non-volatile memory, that stores instructions to cause the one or more processor(s) 206 to perform the techniques described herein.

In this example, memory 212 stores executable software including an application programming interface (API) 240, a communications manager 242, configuration/radio settings 250, a device status log 252 and data 254. Device status log 252 includes a list of events specific to access point 200. The events may include a log of both normal events and error events such as, for example, memory status, reboot or restart events, crash events, cloud disconnect with self-recovery events, low link speed or link speed flapping events, Ethernet port status, Ethernet interface packet errors, upgrade failure events, firmware upgrade events, configuration changes, etc., as well as a time and date stamp for each event. Log controller 255 determines a logging level for the device based on instructions from NMS 130. Data 254 may store any data used and/or generated by access point 200, including data collected from UEs 148, such as a number of client devices connected to an AP device, a length of time of each client device is connected to the AP device, an amount of client traffic transmitted by the AP device over a period of time, or an amount of client traffic received by the AP device over the period of time, that is transmitted by access point 200 for cloud-based management of wireless networks 106 by NMS 130. Data 254 may also store data used to calculate one or more SLE metrics, that is transmitted by access point 200 for cloud-based management of wireless networks 106A by NMS 130.

Input/output (I/O) 210 represents physical hardware components that enable interaction with a user, such as buttons, a display, and the like. Although not shown, memory 212 typically stores executable software for controlling a user interface with respect to input received via I/O 210. Communications manager 242 includes program code that, when executed by processor(s) 206, allow access point 200 to communicate with UEs 148 and/or network(s) 134 via any of interface(s) 230 and/or 220A-220C. Configuration settings 250 include any device settings for access point 200 such as radio settings for each of wireless interface(s) 220A-220C. These settings may be configured manually or may be remotely monitored and managed by NMS 130 to optimize wireless network performance on a periodic (e.g., hourly or daily) basis.

As described herein, AP device 200 may measure and report network data from status log 252 to NMS 130. The network data may comprise event data, telemetry data, and/or other SLE-related data. The network data may include various parameters indicative of the performance and/or status of the wireless network. The parameters may be measured and/or determined by one or more of the UE devices and/or by one or more of the APs in a wireless network. NMS 130 may determine one or more SLE metrics based on the SLE-related data received from the APs in the wireless network and store the SLE metrics as network data 137 (FIG. 1).

Figure 3:
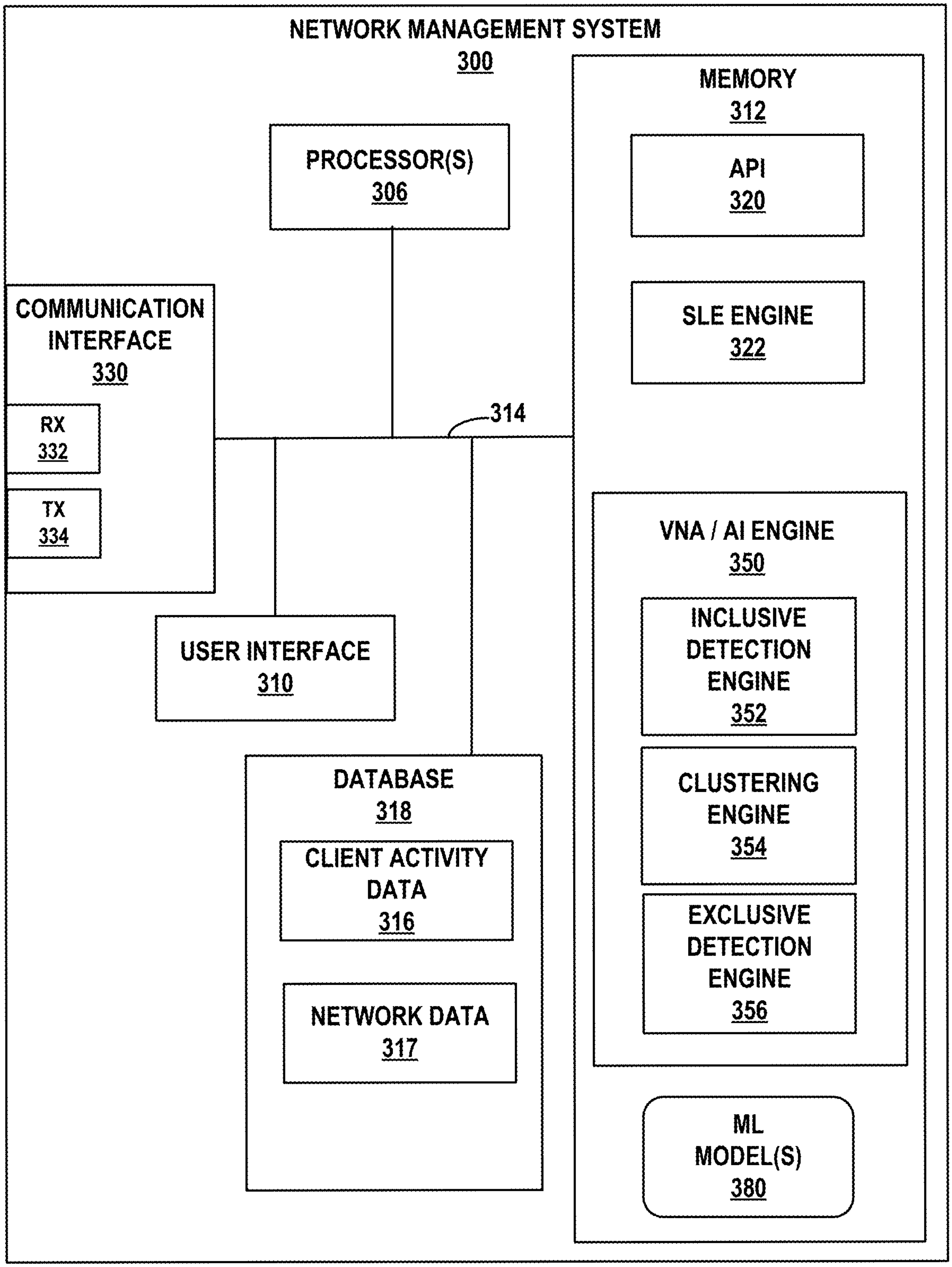
FIG. 3 is a block diagram of an example network management system configured to identify one or more contributing features of an issue with an application session and invoke one or more actions to remedy or prevent the issue, in accordance with one or more techniques of the disclosure.

FIG. 3 is a block diagram of an example NMS 300 configured to determine an anomaly in a behavior of an AP device in accordance with one or more aspects of this disclosure. NMS 300 may be used to implement, for example, NMS 130 in FIG. 1. In such examples, NMS 300 is responsible for monitoring and management of one or more wireless networks 106A-106N at sites 102A-102N, respectively.

NMS 300 includes a communications interface 330, one or more processor(s) 306, a user interface 310, a memory 312, and a database 318. The various elements are coupled together via a bus 314 over which the various elements may exchange data and information. NMS 300 receives client activity data 316 from one or more of APs 142 and stores client activity data 316 in database 318. For example, client activity data 316 may include a number of client devices connected to an AP device at a time, a length of time each client device is connected to the AP device, an amount of client traffic transmitted by the AP device over a period of time, or an amount of client traffic received by the AP device over the period of time. In some examples, NMS 300 receives data from one or more of client devices 148, APs 142, switches 146 and other network nodes within network 134, e.g., routers 187 of FIG. 1B, which may be used to calculate one or more SLE metrics. NMS 300 analyzes this data for cloud-based management of wireless networks 106A-106N via APs 142. In some examples, NMS 300 may be part of another server shown in FIG. 1 or a part of any other server.

Processor(s) 306 execute software instructions, such as those used to define a software or computer program, stored to a computer-readable storage medium (such as memory 312), such as non-transitory computer-readable mediums including a storage device (e.g., a disk drive, or an optical drive) or a memory (such as Flash memory or RAM) or any other type of volatile or non-volatile memory, that stores instructions to cause the one or more processors 306 to perform the techniques described herein.

Communications interface 330 may include, for example, an Ethernet interface. Communications interface 330 couples NMS 300 to a network and/or the Internet, such as any of network(s) 134 as shown in FIG. 1, and/or any local area networks. Communications interface 330 includes a receiver 332 and a transmitter 334 by which NMS 300 receives/transmits data and information to/from any of APs 142, client devices 148, switches 146, servers 110, 116, 122, 128 and/or any other network nodes, devices, or systems forming part of network system 100 such as shown in FIG. 1. In some examples, NMS 300 may take action to address an anomaly via communications interface 330. For example, NMS 300 may send a signal to change a channel to an AP of APs 142 having an issue with noise.

The data and information received by NMS 300 may include, for example, client activity data, telemetry data, SLE-related data, or event data received from one or more of client device APs 148, APs 142, switches 146, or other network nodes, used by NMS 300 to remotely monitor the performance of wireless networks 106 and application sessions from client device to cloud-based application server. NMS 300 may further transmit data and/or commands via communications interface 330 to any of network devices such as client devices 148, APs 142, switches 146, other network nodes within network 134, admin device 111 to remotely manage wireless networks 106 and portions of the wired network. For example, NMS 300 may transmit a command to take a remedial action to an AP device of APs 142.

Memory 312 includes one or more devices configured to store programming engines and/or data associated with operation of NMS 300. For example, memory 312 may include computer-readable storage media, such as non-transitory computer-readable media including one or more storage devices (e.g., disk drives, or optical drives) or memory (such as Flash memory or RAM) or any other type of volatile or non-volatile memory, that stores instructions to cause the one or more processor(s) 306 to perform the techniques described herein.

In this example, memory 312 includes an API 320, an SLE engine 322, and a virtual network assistant (VNA)/AI engine 350. SLE engine 322 enables set up and tracking of thresholds for SLE metrics for each network 106A-106N. SLE engine 322 further analyzes SLE-related data collected by APs, such as any of APs 142 from UEs in each wireless network 106A-106N. For example, APs 142A-1 through 142A-M collect SLE-related data from UEs 148A-1through 148A-M currently connected to wireless network 106A. This data is transmitted to NMS 300, which executes by SLE engine 322 to determine one or more SLE metrics for each UE 148A-1 through 148A-M currently connected to wireless network 106A. This data, in addition to any network data collected by one or more APs 142A-1 through 142A-M in wireless network 106A, is transmitted to NMS 300 and stored as, for example, network data 316 in database 318.

VNA/AI engine 350 analyzes data received from network devices as well as its own data to identify when undesired to abnormal states are encountered at one of the network devices. For example, VNA/AI engine 350 may identify the root cause of any undesired or abnormal states, e.g., any poor SLE metric(s) indicative of connected issues at one or more network devices.

NMS 300 may include VNA/AI engine 350. VNA/AI engine 350 may analyze client activity data 316 to identify anomalies in the behavior of APs 142 and, in some examples, to take remedial actions to attempt to address the anomalies. For example, VNA/AI engine 350 may determine an anomaly in the behavior of AP 142A-1 based on client activity data 316 and may, in some examples, perform, based on the determined anomaly in the behavior of AP 142A-1, a remedial action.

Examples of remedial actions that may be automatically performed by VNA/AI engine 350 may include, but are not limited to, re-initializing a radio, resetting a radio, switching a channel, resetting a device or process associated with monitoring SLE, resetting the AP (e.g., AP 142A-1), disabling a radio, identifying the AP as a return material authorization (RMA) candidate (e.g., the AP itself is defective and should be returned to the manufacturer), etc. These remedial actions are given for example purposes only, and the disclosure is not limited in this respect. In some examples, if automatic remedial actions are not available or do not adequately resolve the anomaly, VNA/AI engine 350 may proactively provide a notification including recommended corrective actions to be taken by IT personnel, e.g., a site or network administrator using admin device 111, to address the anomaly.

VNA/AI engine 350 may include inclusive detection engine 352, clustering engine 354, and/or exclusive detection engine 356. Each of inclusive detection engine 352, clustering engine 354, and/or exclusive detection engine 356 may utilize one or more machine learning model(s) 380 when being executed by processor(s) 306 in the performance of the actions attributed thereto as described in this disclosure.

Inclusive detection engine 352 may be configured to detect anomalies (e.g., potential issues) in the behavior of an AP device of AP devices 142 based on client activity data 316. In some examples, inclusive detection engine 352 may utilize a Holt-Winter Exponential Smoothing model of machine learning model(s) 380 for performing time-series and/or temporal detection of anomalies. As one example, inclusive detection engine 352 may apply a forecast model (e.g., of machine learning model(s) 380) to client activity data 316 to forecast the client activity of an AP device, such as AP 142A-1. For example, inclusive detection engine 352 may utilize historic client activity data of client activity data 316 from one or more of APs 142 to forecast the client activity of AP 142A-1. In some examples, inclusive detection engine 352 may utilize historic client activity data of AP 142A-1 only to forecast client activity of AP 142A-1. In some examples, inclusive detection engine 352 may utilize client activity data from neighboring APs or APs of a same site as AP 142A-1 (e.g., site 102A) when forecasting the client activity of AP 142A-1. For example, when forecasting the client activity of AP 142A-1, inclusive detection engine 352 may use the client activity data of APs 142A-1-142A-M (e.g., AP devices of site 102A).

In some examples, inclusive detection engine 352 may exclude or not utilize client activity data of certain AP devices when applying the forecast model. For example, inclusive detection engine 352 may exclude client activity data from inactive AP devices, inactive sites, new AP devices, dormant AP devices, dormant sites, relatively low activity AP devices, and/or the like. In some examples, inclusive detection engine 352 may exclude client activity data from AP devices obtained during certain time periods, such as weekends, holidays, non-operating hours, or other time periods having expected low client activity. In some examples, an administrator, via admin device 111, may program NMS 300 to exclude such client activity data. In this manner, inclusive detection engine 352 may avoid unnecessary downward skewing of a forecast of client activity data for the AP device, which may otherwise result in detection of fewer anomalies. In some examples, an administrator may pre-select client activity data from certain organizations for inclusive detection engine 352 to apply to the forecast model. An organization may be an entity associated with one or more sites.

In some examples, inclusive detection engine 352 may operate in an offline manner, such as on data that is not received in real time. For example, inclusive detection engine 352 may determine the forecast for client activity based on a plurality of weeks (and/or fractions thereof) of historical client activity data.

In some examples, inclusive detection engine 352 may apply a probabilistic classification algorithm (e.g., of machine learning model(s) 380) to client activity data 316 (or a subset thereof) to forecast a prediction interval (e.g., a range with a certain probability) or a baseline indicative of an estimation of a future observation of client activity (e.g., forecasted number of client devices to be connected to the AP device). For example, inclusive detection engine 352 may employ quantile simulations to forecast an estimated range or baseline of a number of client devices to be connected to AP 142A-1 and/or an estimated range or baseline of an amount of client traffic to be transmitted or received by AP 142A-1. In some examples, inclusive detection engine 352 may use conformal prediction to forecast an estimated range or baseline of a number of client devices to be connected to an access point and/or an estimated range or baseline of an amount of client traffic to be transmitted or received by AP 142A-1. In some examples, inclusive detection engine 352 may apply one or more time-series models (e.g., of machine learning model(s) 380 to determine the forecast baseline and/or prediction intervals taking into account trends and/or seasonality of client activity data (e.g., typical business operating hours, holidays, etc.).

Inclusive detection engine 352 may, in some examples, detect an anomaly in the behavior of an AP device by determining whether incoming client activity data is within the forecasted prediction interval or above the baseline. For example, a determination that the incoming client activity data falls below the lower prediction interval of the forecasted prediction interval or below the baseline may be indicative of an anomaly in the behavior of the AP device. In some examples, the upper limit of the prediction interval (upper_ci) is the $98^{th}$ percentile and the lower limit of the prediction interval (lower_ci) is the $2^{nd}$ percentile. In such examples, inclusive detection engine 352 may detect an anomaly if a current value is below: 2% forecast interval (lower_ci).

In some examples, inclusive detection engine 352 may be configured to detect anomalies in the behavior of AP 142A-1 based on a comparison of client activity data between AP 142A-1 and peer AP devices. As referred to herein, AP 142A-1 is the subject AP device that is an AP device for which an anomaly in behavior is determined. A peer AP device may be an AP device that neighbors, is relatively closely located to, or is within a threshold distance of and/or signal strength to, the AP device being checked for anomalies (AP 142A-1) or a peer AP device may be an AP device, such as an AP device with a number of client devices connected thereto, that is located at a same site as the AP device that is being checked for anomalies. In some examples, a peer AP device may be an AP device of a same model, make, software edition, and/or the like, as the subject AP device. In some examples, a peer AP device may be an AP device that the AP device being checked for anomalies detects a signal of at least a predefined signal strength (e.g., RSSI) from.

In these examples, inclusive detection engine 352 may obtain client activity data corresponding to peer AP devices for example of client activity data 316. Inclusive detection engine 352 may employ one or more thresholds (such as an activity threshold) to the client activity data corresponding to peer AP devices to determine whether an AP device has anomalies. There may be a threshold, such as an activity threshold, for each client activity metric for which the subject AP device is compared to one or more peer AP device(s) and/or there may be a threshold, such as an activity threshold, for a combination of different client activity metrics, such as for a score based on a plurality of client activity metrics. For example, inclusive detection engine 352 may compare the client activity data corresponding to the subject AP device and one or more peer AP device(s) to the subject AP device, and based on the comparison, may detect an anomaly in the behavior of AP 142A-1. For example, AP 142A-1 and AP 142A-M may be neighbors.

In an example, the number of client devices connected to an AP device may be a client activity metric. In this example, inclusive detection engine 352 may obtain a number of client devices connected to AP 142A-1 and a number of client devices connected to AP 142A-M, and based on a comparison of the number of client devices corresponding to AP 142A-1 and the number of client devices corresponding to AP 142A-M, may determine that there is a discrepancy (e.g., difference) between the number of client devices connected to 142A-1 (e.g., 0 connected client devices over a period of time) and the number of client devices connected to AP 142A-M (e.g., 100 connected client devices over the same period of time) that may indicate a potential issue with 142A-1, for example, when the discrepancy differs by more than (or more than or equal to) an activity threshold amount of client devices.

In an example, the amount of client traffic of an AP device may be a client activity metric. In this example, inclusive detection engine 352 may obtain client activity data, such as an amount of client traffic corresponding to 142A-1 and an amount of client traffic corresponding to AP 142A-M, and based on a comparison of the amount of client traffic corresponding to 142A-1 with the amount of traffic corresponding to AP 142A-M, may determine that there is a discrepancy between the amount of client traffic between the peer AP devices that may indicate a potential issue with 142A-1, for example, when the discrepancy differs by more than (or more than or equal to) an activity threshold amount of client traffic.

In some examples, the NMS may obtain client activity data corresponding to all AP devices at a site to identify whether the potential issue is attributable to the site-level device rather than to individual AP devices (e.g., issue with an edge device connected to the AP devices). The aforementioned examples discuss a single peer device. If there are a plurality of peer devices, inclusive detection engine 352 may average or otherwise combine client activity data from the plurality of peer devices as part of the comparison to the AP device for whom the existence of potential anomalies is being performed.

In some examples, inclusive detection engine 352 may operate in an offline manner, such as on data that is not received in real time. For example, inclusive detection engine 352 may compare client activity data of the subject AP device and the peer AP device(s) on an hourly basis.

In some examples, inclusive detection engine 352 may determine an anomaly in the behavior of an AP device based on a comparison to the past behavior of the AP device. For example, inclusive detection engine 352 may determine one or more incidents in historical client activity data in which the AP device had no connected client devices or a significantly low number of connected client devices (e.g., a number of connected client devices less than, or less than or equal to, a threshold) for a relatively long duration (e.g., a threshold duration of, for example, at least an hour, a day, or the like). Inclusive detection engine 352 may determine duration information associated with the one or more incidents. For example, inclusive detection engine 352 may determine the duration information to include a longest duration of the one or more incidents, an average duration of the one or more incidents, or the like. Inclusive detection engine 352 may determine an incident in current (e.g., the latest received) client activity data in which the AP device had no connected client devices or a significantly low number of connected client devices for a relatively long duration. Inclusive detection engine 352 may determine a difference between the duration of the incident in the current client activity data and the duration information and determine whether the difference satisfies a difference threshold. If the difference satisfies (e.g., is greater than, or greater than or equal to) the threshold, that may be indicative of there being an anomaly in the behavior of the AP device.

Inclusive detection engine 352 may store information associated with AP devices identified as including anomalies in behavior in network data 320. For example, inclusive detection engine may store an identification of the AP device, a time associated with the anomaly, or the like, in network data 320.

In some examples, inclusive detection engine 352 may determine one or more scores associated with the comparison to the forecast, the comparison to peer AP(s), or other techniques to determine an anomaly in the behavior of an AP. Inclusive detection engine 352 may utilize the score(s) to determine an occurrence of an anomaly and/or a severity of an anomaly. For example, inclusive detection engine 352 may determine a combined score based on both a score of the comparison to the forecast and a score of the comparison to peer AP(s).

In some examples, the upper limit of the prediction interval (upper_ci) is the $98^{th}$ percentile and the lower limit of the prediction interval (lower_ci) is the $2^{nd}$ percentile. In such examples, inclusive detection engine 352 may detect an anomaly if a current value is below 2% forecast interval (lower_ci).

In some examples, inclusive detection engine 352 may determine a generalized z-score based on the prediction intervals as score=(current value−lower_ci)/(average forecast value−lower_ci) which may be a ratio of the current value deviation from an average forecast value to width of low prediction interval. If the score is less than or equal to 0, that means the current value is below or on the lower 2% boundary. If the score is greater than 0, that means the current value is within the 98% prediction interval.

Inclusive detection engine 352 may determine a forecast severity based on an anomaly being detected across a plurality of metrics. For example, a severity value may be added to a severity score based on each metric from which the anomaly is detected. For example, if the anomaly is detected based on the forecast comparison and a peer comparison, a severity value may be added to the severity score and/or scores for each of the forecast comparison and the peer comparison may be combined as part of determining the severity score.

Additionally, or alternatively, severity scores may be based on detected anomalies using different types of client activity data. For example, forecast scores based on transmit traffic, receive traffic, and active client minutes may include three forecast scores which may be utilized to determine a severity score. For example, peer activity scores based on a comparison of peer AP device connected client devices, transmit traffic, and receive traffic, to that of a detected AP may include three peer activity scores which may be used to determine a severity score. For example, duration scores based on duration of intervals with low and/or no traffic on detected on an AP device may be utilized to determine a severity score. In some examples, combination(s) of one or more of a forecast score, a peer activity score, and/or a duration score may be used to determine a severity score.

For example, inclusive detection engine 352 may determine a forecast score as forecast score=(current value− lower_ci)/(forecast−lower_ci). Inclusive detection engine 352 may determine a forecast z score as forecast z_score=1/(1+exp(−abs(forecast score))). Inclusive detection engine 352 may determine a peer score based on AP client counts. For example, inclusive detection engine may determine a peer score as peer score=(median of client minutes)/(median of client minutes−10 percent quantile). Inclusive detection engine 352 may determine a peer z score as peer z_score=1/(1+exp(−abs(peer score))). Inclusive detection engine 352 may determine a duration score as duration z_score=1/(1+exp(−abs(duration))).

In some examples, inclusive detection engine 352 may determine a cumulative score based on the forecast z score, the peer z score, and/or the duration z score. For example, inclusive detection engine 352 may determine a combined z score as combined_z_score=100/norm*sum (score_weight*z_score), where norm=sum(score_weight) and weights are machine learning model parameters optimized to reduce false positive detections. For example, an initial setting of the weights may include forecast_client-_minutes: 1.0, forecast tx_bytes: 0.3, forecast rx_bytes: 0.2, peer score: 1.5, duration score: 1.5. It should be noted that such weights may be user selectable and/or may be adjustable through training of the machine learning model(s) 80. In some examples, inclusive detection engine 352 may send one or more of the scores discussed herein, such as the severity score, as part of a report, for example, to admin device 111.

Clustering engine 354 may be configured to determine the scope of the issue (e.g., whether the anomaly is experienced at an organization level, a site level, an AP device level, an AP model type level, an AP firmware release level, etc.) and to classify the AP devices having detected anomalies (e.g., as determined by inclusive detection engine 352) as AP devices with a known issue, AP devices with an unknown issue, and/or AP devices that were incorrectly identified as having an issue (e.g., a false positive). In some examples, clustering engine 354 may utilize a nearest neighbor and/or mutual information model of machine learning model(s) 380 when determining the scope of the issue and/or classifying the AP devices having detected anomalies.

In some examples, clustering engine 354 may determine how to classify an AP device based on AP states, SLE events (e.g., as determined by SLE engine 322), clustering error-counters, and/or a time series session analysis, for example, which may be received and/or stored in network data 317.

In some examples, clustering engine 354 may determine an AP device to have a known issue based on known symptoms being experienced by the subject AP device. Example known symptoms may include transmit PHY errors, decrypt issues, beacon dropping, a high noise floor, etc. Such symptoms may be determined by clustering engine 354, SLE engine 322, received in network data, or any combination thereof. In some examples, clustering engine 354 may determine an AP device to have an unknown issue based on symptoms experienced by the subject AP device not being known symptoms or not being completely within a group of known symptoms.

For AP devices with known issues, clustering engine 354 may send an indication to exclusive detection engine 356 for exclusive detection engine 356 to determine an action to take in an attempt to remedy the anomaly.

For AP devices with unknown issues, clustering engine 354 may send information associated with the AP device with unknown issues (e.g., the client behavior data and/or other information), for example, to admin device 111, for further analysis, for example by tech support or an administrator.

In some examples, clustering engine 356 may classify one or more AP devices that were incorrectly identified as having an issue. An AP device incorrectly identified as having an issue may be an AP device not actually having an anomaly or an AP device for which the anomaly self-corrects. For such AP devices, clustering engine 356 may ignore the identified anomaly or may provide feedback to inclusive detection engine 352, such as in the form of training of associated machine learning model(s) 380.

Exclusive detection engine 356 is configured to perform one or more remedial actions for AP devices with known issues. In some examples, exclusive detection engine 356 may use a reinforcement model of machine learning model (s) 380 when determining which remedial actions to perform. The remedial actions may include re-initializing a radio of the AP device, resetting the radio of the AP device, switching a channel of the AP device, restarting a device or process associated with monitoring SLE metrics, resetting the AP device, identifying the AP device as a candidate for, or initiating, an RMA procedure, etc. Exclusive detection engine 356 may initiate a remedial action through the use of API 320 to issue a command to the subject AP device.

If a first action taken by exclusive detection engine 356 fails to rectify the anomaly, exclusive detection engine 356 may take another action to rectify the anomaly. In some examples, this may continue until the anomaly is rectified or the subject AP device is identified for an RMA procedure or an RMA procedure is initiated for the subject AP device. In some examples, the actions taken by exclusive detection engine 356 may start as less disruptive to operations of a wireless network, with each successive action relating to a same subject AP device increasing in disruptiveness to the operations of the wireless network.

For example, exclusive detection engine 356 may be configured to, based on the output of inclusive detection engine 352, clustering engine 354, and/or client activity data 316, determine which remedial action to take, and, if the action is unsuccessful, which remedial action to take next. For example, exclusive detection engine 356 may utilize information such as the existence of interference, a noise floor, an error count from an AP radio, or the like, which may be stored in network data 317 and/or determined by SLE engine 322, when determining which remedial action to take.

For example, exclusive detection engine 356 may determine a remedial action to take based on known symptoms. For example, if the symptoms include that the AP device has no connected clients, the beacon has dropped or is dropping, and there is a transmit PHY error logged, exclusive detection engine 356 may determine the remedial action to be to re-initiate the subject AP device. In another example, if the symptoms include the AP stations cache being full and no additional clients being added, exclusive detection engine 356 may determine to first switch a channel of the subject AP device. Exclusive detection engine 356 may determine, if switching the channel does not remedy the anomaly, to restart the device or process associated with monitoring SLE metrics and/or reset the radio of the subject AP device. Other example symptoms that may be utilized to determine which action to take may include a relatively high noise floor, a new error counter (such as with a new AP model or new AP firmware), etc.

NMS 300 may utilize a self-validation loop to train machine learning model(s) 380. For example, when an anomaly is detected and the action taken alleviates the anomaly, NMS 300 may reinforce the detection of the anomaly and/or the selection of the action through training of machine learning model(s) 380, such as adjusting weights to emphasize the predictions made by machine learning model(s) 380. When an anomaly is detected, but remains after one or more actions are taken or if the anomaly self-resolves without action, action, NMS 300 may deemphasize the detection of the anomaly and/or the selection of the action through training of machine learning model(s) 380, such as adjusting weights to deemphasize the predictions made by machine learning model(s) 380.

Although the techniques of the present disclosure are described in this example as performed by NMS 130, techniques described herein may be performed by any other computing device(s), system(s), and/or server(s), and that the disclosure is not limited in this respect. For example, one or more computing device(s) configured to execute the functionality of the techniques of this disclosure may reside in a dedicated server or be included in any other server in addition to or other than NMS 130, or may be distributed throughout network 100, and may or may not form a part of NMS 130.

Figure 4:
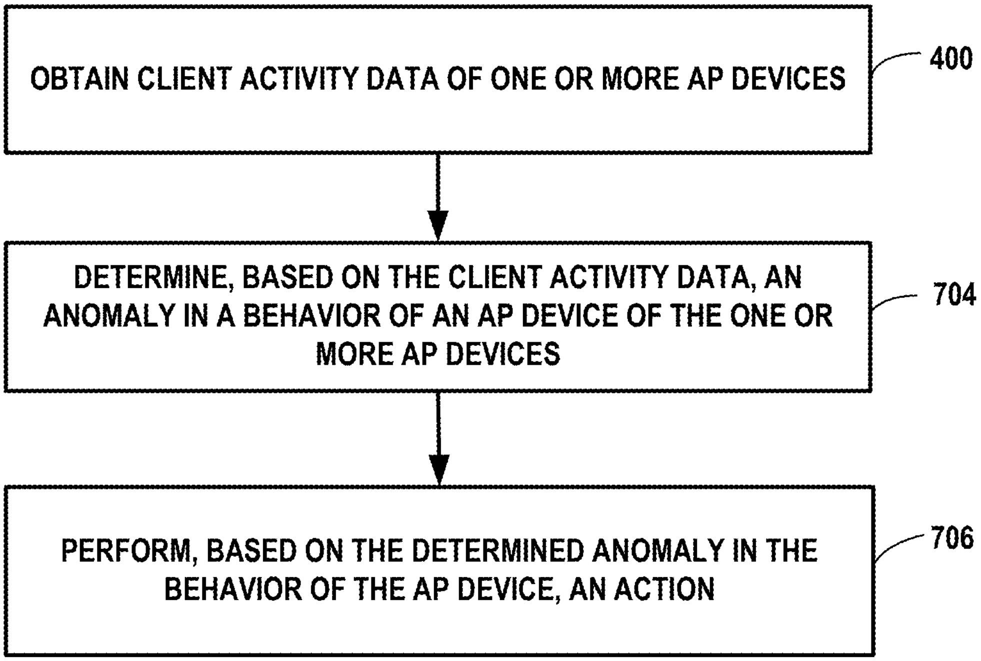
FIG. 4 is a flowchart illustrating an example operation of reactive issue determination, in accordance with one or more techniques of the disclosure.

FIG. 4 is a flowchart illustrating an example operation of reactive issue determination, in accordance with one or more techniques of the disclosure. The example operation of FIG. 4 is described with respect to NMS 130 of FIGS. 1A-1B.

NMS 130 may obtain client activity data of a plurality of access point (AP) devices at a site (400). For example, NMS 130 may receive or retrieve client activity data 137 from one or more AP devices of APs 142.

NMS 130 may determine, based on the client activity data, an anomaly in a behavior of an AP device of the one or more AP devices (402). For example, NMS 130 may determine, based on the client activity data, an anomaly in a behavior of an AP device of the one or more AP devices, wherein as part of determining the anomaly in the behavior of the AP device, the one or more processors are configured to at least one of a) determine, based on the client activity data, a forecasted client activity data of the AP device and compare the forecasted client activity data to actual client activity data of the AP device, or b) compare client activity data of at least one peer AP device to the actual client activity data of the AP device NMS 130 may perform, based on the determined anomaly in the behavior of the AP device, an action (404). For example, NMS 130 may attempt to address the determined anomaly by taking a remedial action.

While primarily described herein with respect to determining an anomaly in behavior of an AP (which may include the behavior of a radio of an AP), in some examples, NMS 130 may obtain client activity data of a plurality of access point (AP) devices at a site. NMS 130 may determine, based on the client activity data, an anomaly in behavior of a wireless network provided by the one or more AP devices. As part of determining the anomaly in the behavior of the wireless network, the one or more processors may be configured to at least one of a) determine, based on the client activity data, a forecasted client activity data of the wireless network and compare the forecasted client activity data to actual client activity data of the wireless network, or b) compare client activity data of at least one peer wireless network to the actual client activity data of the wireless network. NMS 130 may perform, based on the determined anomaly in the behavior of the wireless network, an action. For example, NMS 130 may attempt to address the determined anomaly by taking a remedial action.

In some examples, the actual client activity data includes at least one of a number of client devices connected to an AP device or a radio of the AP device at a time, a length of time each client device is connected to the AP device or the radio, an amount of client traffic transmitted by the AP device or the radio over a period of time, or an amount of client traffic received by the AP device or the radio over the period of time. In some examples, NMS 130 may, prior to determining the anomaly in the behavior of the AP device, filter out a first portion of the client activity data from the client activity data such that the one or more processors determine the anomaly in the behavior of the AP device based on a second portion of the client activity data, the second portion of the client activity data not including the first portion of the client activity data. In some examples, NMS 130 may determine to filter out the first portion of the client activity data based on the first portion of the client activity data being associated with at least one of an inactive AP device, an inactive radio, an inactive site, a new AP device, a dormant AP device, a dormant radio, a dormant site, or an AP device or radio having an activity level below an activity level threshold.

In some examples, NMS 130 may pre-select the client activity data to be obtained from at least one organization. In some examples, NMS 130 may determine the forecasted client activity data of the AP device and wherein as part of determining the forecasted client activity data of the AP device, NMS 130 may apply a probabilistic classification algorithm to the client activity data to forecast at least one of a prediction interval or a baseline indicative of an estimation of future client activity. In some examples, the probabilistic classification algorithm includes at least one of a quantile simulation or a conformal prediction. In some examples, wherein as part of determining the anomaly in the behavior of the AP device, NMS 130 may at least one of determine whether current client activity data is within the forecasted prediction interval or determine whether the current client activity data satisfies the baseline.

In some examples, NMS 130 may compare the client activity data of at least one peer AP device, and the at least one peer AP device at least one of a) is located at a same site as the AP device or b) detects a signal from the AP device of at least a predetermined signal strength. In some examples, as part of determining the anomaly in the behavior of the AP device, NMS 130 may determine whether client activity data of the at least one peer AP device differs by more than an activity threshold amount than client activity data of the AP device.

In some examples, NMS 130 may, as part of determining the anomaly in the behavior of the AP device, determine one or more first incidents, based on historical client activity data, where a number of connected client devices to the AP device or a radio of the AP device was lower than a connected client device threshold for longer than a length of time threshold. For example, NMS 130 may determine that there are three incidents where the number of connected client devices to AP device 142A-1 was lower than five for longer than one hour. NMS 130 may determine duration information related to the one or more incidents. For example, NMS 130 may determine that the total duration of the three incidents was six hours or an average of two hours. NMS 130 may determine a difference between the duration information and a duration of a second incident where the number of connected client devices to the AP device or the radio is lower than the connected client device threshold, the duration of the second incident being based on current client activity data. For example, NMS 130 may determine that a second incident (e.g., an incident indicated in the latest acquired client activity data) where a number of connected client devices to the AP device is lower than five has a duration of 24 hours. NMS 130 may determine the difference between the average duration of the first incidents (e.g., two hours) and the duration of the second incident (e.g., 24 hours) to be 22 hours. NMS 130 may determine that the difference satisfies a difference threshold. For example, NMS 130 may determine that 22 hours satisfies (e.g., is greater than, or greater than or equal to) the difference threshold.

In some examples, NMS 130 may determine the forecasted behavior of the AP device and compare the client activity data of the at least one peer AP device. In some examples, as part of determining the anomaly in the behavior of the AP device, NMS 130 may determine a composite score from a score associated with the forecasted behavior and a score associated with the comparison of the client activity data of the at least one peer AP device. In some examples. NMS may send the composite score as part of a report to an administrator device.

In some examples, NMS 130 may determine an identity of each of the plurality of AP devices that have an associated anomaly. In some examples, NMS 130 may, based on the determination of the identity of each of the plurality of AP devices that have an associated anomaly, determine a level of an issue associated with the determined anomaly, wherein the level of the issue comprises an organizational level, a site level, or an AP device level. In some examples, NMS 130 may classify each of the plurality of the AP devices that have an associated anomaly as an AP device with a known issue, an AP device with an AP device with an unknown issue, or an AP device that was incorrectly identified as having an issue. In some examples, the AP device is classified as an AP device with a known issue, and based on the AP device being classified as an AP device with a known issue, the remedial action includes at least one of re-initializing a radio of the AP device, resetting the radio of the AP device, switching a channel of the AP device, restarting a device or process associated with monitoring SLE metrics, resetting the AP device, or initiating a return material authorization (RMA) procedure.

In some examples, the AP device is classified as an AP device with an unknown issue, and, based on the AP device being classified as an AP device with an unknown issue, the remedial action comprises sending information associated with the AP device to an administrator device for further analysis. In some examples, the AP device is classified as an AP device that was incorrectly identified as having the issue, and, based on the AP device being classified as an AP device incorrectly identified as having the issue, NMS 130 may update a stored state of the AP device to indicate that the AP device does not have an anomaly.

The techniques described herein may be implemented in hardware, software, firmware, or any combination thereof. Various features described as engines, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively, or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random-access memory (RAM), read-only memory (ROM), non-volatile random-access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term “non-transitory” may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term “processor,” as used herein may refer to any of the foregoing structure or any other structure suitable for implementation of the techniques described herein. In addition, in some aspects, functionality described in this disclosure may be provided within software engines or hardware engines.

What is claimed is:

1. A network management system comprising:

one or more processors; and one or more memories comprising instructions executable by the one or more processors to cause the network management system to:

obtain client activity data of one or more access point (AP) devices;

determine, based on the client activity data, an anomaly in a behavior of an AP device of the one or more AP devices, wherein as part of determining the anomaly in the behavior of the AP device, the one or more processors are configured to at least one of a) determine, based on the client activity data, a forecasted client activity data of the AP device and compare the forecasted client activity data to actual client activity data of the AP device, or b) compare client activity data of at least one peer AP device to the actual client activity data of the AP device, wherein the actual client activity data of the AP device comprises at least one of a number of client devices connected to the AP device or a radio of the AP device at a time, or a length of time each client device is connected to the AP device or the radio;

determine an identity of each of the one or more AP devices that have an associated anomaly:

based on the determination of the identity of each of the plurality of AP devices that have an associated anomaly, determine a level of an issue associated with the determined anomaly, wherein the level of the issue is an organizational level, a site level, or an AP device level; and perform, based on the determined anomaly in the behavior of the AP device, an action.

2. The network management system of claim 1, wherein the actual client activity data of the AP device further comprises at least one of an amount of client traffic transmitted by the AP device or the radio over a period of time, or an amount of client traffic received by the AP device or the radio over the period of time.

3. The network management system of claim 1, wherein the instructions further cause the network management system to, prior to determining the anomaly in the behavior of the AP device, filter out a first portion of the client activity data from the client activity data such that the one or more processors determine the anomaly in the behavior of the AP device based on a second portion of the client activity data, the second portion of the client activity data not including the first portion of the client activity data.

4. The network management system of claim 1, wherein the instructions further cause the network management system to pre-select the client activity data to be obtained from at least one organization.

5. The network management system of claim 1, wherein the instructions further cause the network management system to determine the forecasted client activity data of the AP device, and wherein as part of determining the forecasted client activity data of the AP device, the one or more processors are configured to apply a probabilistic classification algorithm to the client activity data to forecast at least one of a prediction interval or a baseline indicative of an estimation of future client activity.

6. The network management system of claim 1, wherein the instructions further cause the network management system to compare the client activity data of at least one peer AP device, and wherein the at least one peer AP device at least one of a) is located at a same site as the AP device or b) detects a signal from the AP device of at least a predetermined signal strength.

7. The network management system of claim 6, wherein as part of determining the anomaly in the behavior of the AP device, the instructions cause the network management system to determine whether client activity data of the at least one peer AP device differs by more than an activity threshold amount than the actual client activity data of the AP device.

8. The network management system of claim 1, wherein as part of determining the anomaly in the behavior of the AP device, the instructions further cause the network management system to:

determine one or more first incidents, based on historical client activity data, where a number of connected client devices to the AP device or a radio of the AP device was lower than a connected client device threshold for longer than a length of time threshold;

determine duration information related to the one or more first incidents;

determine a difference between the duration information and a duration of a second incident where the number of connected client devices to the AP device or the radio is lower than the connected client device threshold, the duration of the second incident being based on current client activity data; and determine that the difference satisfies a difference threshold.

9. The network management system of claim 1, wherein the instructions further cause the network management system to determine a forecasted behavior of the AP device and to compare the client activity data of the at least one peer AP device, and wherein as part of determining the anomaly in the behavior of the AP device, the one or more processors are configured to determine a composite score from a score associated with the forecasted behavior and a score associated with the comparison of the client activity data of the at least one peer AP device.

10. The network management system of claim 9, wherein the instructions further cause the network management system to send the composite score as part of a report to an administrator device.

11. The network management system of claim 1, wherein the instructions further cause the network management system to classify each of the plurality of the AP devices that have an associated anomaly as an AP device with a known issue, an AP device with an AP device with an unknown issue, or an AP device that was incorrectly identified as having an issue.

12. The network management system of claim 11, wherein the AP device is classified as an AP device with a known issue, and wherein, based on the AP device being classified as an AP device with a known issue, the action comprises at least one of re-initializing a radio of the AP device, resetting the radio of the AP device, switching a channel of the AP device, restarting a device or process associated with monitoring subscriber level experience (SLE) metrics, resetting the AP device, or initiating a return material authorization (RMA) procedure.

13. The network management system of claim 11, wherein the AP device is classified as an AP device with an unknown issue, and wherein, based on the AP device being classified as an AP device with an unknown issue, the action comprises sending information associated with the AP device to an administrator device for further analysis.

14. The network management system of claim 11, wherein the AP device is classified as an AP device that was incorrectly identified as having the issue, and wherein, based on the AP device being classified as an AP device incorrectly identified as having the issue, update a stored state of the AP device to indicate that the AP device does not have an anomaly.

15. A network management system comprising:

one or more processors; and one or more memories comprising instructions executable by the one or more processors to cause the network management system to:

obtain client activity data of one or more access point (AP) devices;

prior to determining an anomaly in a behavior of the AP device, filter out a first portion of the client activity data from the client activity data such that the one or more processors determine the anomaly in the behavior of the AP device based on a second portion of the client activity data, the second portion of the client activity data not including the first portion of the client activity data;

determine, based on the second portion of the client activity data, an anomaly in a behavior of an AP device of the one or more AP devices, wherein as part of determining the anomaly in the behavior of the AP device, the one or more processors are configured to at least one of a) determine, based on the second portion of the client activity data, a forecasted client activity data of the AP device and compare the forecasted client activity data to actual client activity data of the AP device, or b) compare client activity data of at least one peer AP device to the actual client activity data of the AP device, wherein the actual client activity data of the AP device comprises at least one of a number of client devices connected to the AP device or a radio of the AP device at a time, or a length of time each client device is connected to the AP device or the radio; and perform, based on the determined anomaly in the behavior of the AP device, an action.

16. The network management system of claim 15, wherein the instructions cause the network management system to determine to filter out the first portion of the client activity data based on the first portion of the client activity data being associated with at least one of an inactive AP device, an inactive radio, an inactive site, a new AP device, a dormant AP device, a dormant radio, a dormant site, or an AP device or radio having an activity level below an activity level threshold.

17. A network management system comprising:

one or more processors; and one or more memories comprising instructions executable by the one or more processors to cause the network management system to:

obtain client activity data of one or more access point (AP) devices;

determine, based on the client activity data, an anomaly in a behavior of an AP device of the one or more AP devices, wherein as part of determining the anomaly in the behavior of the AP device, the one or more processors are configured to at least one of a) determine, based on the client activity data, a forecasted client activity data of the AP device and compare the forecasted client activity data to actual client activity data of the AP device, or b) compare client activity data of at least one peer AP device to the actual client activity data of the AP device, wherein the actual client activity data of the AP device comprises at least one of a number of client devices connected to the AP device or a radio of the AP device at a time, or a length of time each client device is connected to the AP device or the radio, wherein the one or more processors are configured to determine the forecasted client activity data of the AP device, and wherein as part of determining the forecasted client activity data of the AP device, the one or more processors are configured to apply a probabilistic classification algorithm to the client activity data to forecast at least one of a prediction interval or a baseline indicative of an estimation of future client activity; and perform, based on the determined anomaly in the behavior of the AP device, an action.

18. The network management system of claim 17, wherein the probabilistic classification algorithm comprises at least one of a quantile simulation or a conformal prediction.

19. The network management system of claim 17, wherein as part of determining the anomaly in the behavior of the AP device, the instructions further cause the network management system to at least one of determine whether current client activity data is within the prediction interval or determine whether the current client activity data satisfies the baseline.

* * * * *